Patented Feb. 28, 1933

1,899,287

UNITED STATES PATENT OFFICE

ADAM MEIRO, OF BRUSSELS, BELGIUM

PROCESS FOR THE EXTRACTION OF SUGAR FROM SUGAR JUICES

No Drawing. Application filed January 30, 1931, Serial No. 512,495, and in France August 26, 1930.

The invention relates to a process for treating sugar juice and refers more particularly to a process for completely extracting of all the sugar and solid matter from the juice of sugar cane and of beetroot and of all plants containing sugar.

All juice of beetroot, sugar cane and the juice of all plants containing sugar, slightly alkaline or neutral, is evaporated in the known manner in apparatus of any kind (in a vacuum or under atmospheric pressure).

The present invention comprises the feature that, in order to obtain a dry mass consisting of all solid matter in the juice, the latter is mixed with oil of any kind, non-saponifying and hot, preferably not above 75° C., in quantities from about three to five times the weight of all solid matter in the juice in a dehydrated state.

This non-saponifying oil must have a boiling point above that of the water in the sugar syrup, the most suitable oils being petroleum oils.

All this liquid mixture of juice and oil in the apparatus, is heated indirectly by steam, and owing to the rotary motion imparted to the mixture, the water is evaporated rapidly.

Such oil, which is hot, destroys the elements of fermentation in enzymes, bacteria and other juice and prevents their formation. During the rotary motion of the hot oil with the juice to be evaporated, no incrustation of salts or other solid matter forms on the walls and the coils of the evaporators. The heating and the subsequent filtering of the juice favours the coagulation of the albuminous substances and of other globules of granular matter and also their separation. The non-saponifying oils, preferably ribs containing petroleum, serve as solvents of some of the free organic acids, as solvents for the fatty matter in the juice and of several pectinic products. These oils absorb the nitrogen and some of its combinations; they dissolve several colouring matters in the juice, such as the chlorofyl, etc.

This oil in a state of emulsion also plays a mechanical part, i. e. it lubricates the solid matter in the juice, and thus acts as an insulator to prevent or reduce the reactions of the solid matter in the juice.

The end of the evaporation takes place in the oil itself, until all the solid matter in the juice is obtained in a completely dehydrated form. This dehydration may be facilitated by blowing hot air, either into the mass under treatment, or above the same, to remove the last traces of moisture. When the evaporation of the water is finished, stirring is stopped and the then stationary as well as the solid matter which mostly falls below the oil in the apparatus; then the oil is filtered for regeneration and the following similar operations. Then an ether, for instance petroleum spirit, is added to the crystallized and coagulated solid matter residue, which contains traces of oil. The mixture is kneaded and heated simultaneously by indirect application of steam, and then the ether and the oil are removed by filtering. These steps may be carried out in a device commonly known as the Soxhlet apparatus which consists of a hermetically closed container, the interior of which is divided by a filter, the upper part being provided with a stirrer. Since sugar does not dissolve in ether or in oil, a mixture of these two substances will not remove any sugar from the residue.

After having been washed with ethers, the dehydrated solid matter is again washed in the known manner in ethyl or methyl alcohol in a hermetically closed apparatus of any suitable construction, for instance the Soxhlet apparatus. The raw sugar obtained after this treatment is subjected to the usual operations, such as decoloration. Since the residue of the solid matter in the juice is completely dry after the extraction of all the sugar has taken place, it constitutes an organic or inorganic fertilizer for the culture of beetroot or other plants.

By the use of this process for treating the juice of beetroots, sugar cane and of other plants containing sugar, there is obtained:

(a)—A complete extraction of the sugar in the juice (b)—A complete separation of the sugar from the other solid matter contained in the juice—such as organic or inorganic fertilizers and (c)—The suppression of molasses, which increases the percentage of crystallized sugar, as compared with processes known in prior art.

I claim:

1. A process for extracting sugar, comprising the steps of evaporating a sugar juice in a non-saponifying oil having a boiling point higher than the boiling point of sugar juice maintaining the mixture of oil and juice in a state of emulsion until the coagulation and crystallization of the sugar and non-saccharine parts takes place and separating them from the oil.

2. A process according to claim 1, characterized in that the oil used for evaporation contains petroleum.

3. A process according to claim 1, characterized in that the oil is added to the juice in the proportion of about three to five times the weight of the sugar and of the non-saccharine solids contained in the juice.

4. A process according to claim 1, characterized in that the oil is added to the juice in a heated state, its temperature not exceeding about 75° C.

5. A process for extracting sugar from sugar cane and beet root, comprising the steps of dehydrating the sugar and solid matter contained in a juice by evaporating said juice in a non-saponifying oil, said evaporation being carried out until a coagulation and crystallization of the substances dissolved in said juice takes place, separating said sugar and solid matter from said oil by decanting, washing the residue with an ether, and then washing said residue with an alcohol.

6. A process of treating a sugar containing juice comprising in combinaton the steps of mixing a juice containing sugar and water with a non-saponifying oil, and heating the mixture until said water is evaporated, the substances contained in said juice in a dissolved state and in suspension being coagulated and crystallized at the end of the evaporation.

7. A process for extracting sugar from sugar cane and beet root, comprising in combination, adding a hot non-saponifying oil to a sucrose-containing juice, evaporating the mixture, washing the residue with an ether for the purpose of removing said oil, and then washing the residue with an alcohol-containing substance.

In testimony whereof I have signed my name to this specification.

ADAM MEIRO.